United States Patent [19]
Bosman

[11] 4,261,458
[45] Apr. 14, 1981

[54] CONVEYING SYSTEM FOR ROLL CONTAINERS

[75] Inventor: Theodoor Bosman, Leidschendam, Netherlands

[73] Assignee: Staat der Nederlanden (Staatsbedrijf der Posterijen, Telegrafie en Telefonie), The Hague, Netherlands

[21] Appl. No.: 40,315

[22] Filed: May 18, 1979

[30] Foreign Application Priority Data

May 25, 1978 [NL] Netherlands ............... 7805707

[51] Int. Cl.[3] .................. B65G 35/02; B65G 25/00
[52] U.S. Cl. ................................. 198/725; 198/735; 104/165
[58] Field of Search ............ 198/725, 472, 795, 735; 104/165, 168, 162, 163; 312/200–202; 108/22

[56] References Cited
U.S. PATENT DOCUMENTS

| | | | |
|---|---|---|---|
| 2,717,699 | 9/1955 | Spindler et al. | 198/795 |
| 3,049,214 | 8/1962 | Cormia et al. | 198/725 |
| 3,361,083 | 1/1968 | Babson | 104/168 |
| 3,743,074 | 7/1973 | Sorbie | 198/725 |
| 3,743,116 | 7/1973 | Giessler et al. | 104/165 |
| 4,147,252 | 4/1979 | Burkhardt | 198/735 |

FOREIGN PATENT DOCUMENTS 899174  10/1953  Fed. Rep. of Germany .......... 198/735

Primary Examiner—Robert B. Reeves
Assistant Examiner—Brian Bond
Attorney, Agent, or Firm—Hugh Adam Kirk

[57] ABSTRACT

Conveying system for roll containers (7,8) having no more than one fixed axis on which wheels are aligned and at least one swivel wheel. The system has a track constituted by a transversely sloping floor. Over the lower side of the floor there is a conveyer (3) which—by friction—moves along any roll containers (7,8) standing on the floor and leaning against the conveyer (3).

2 Claims, 3 Drawing Figures

CONVEYING SYSTEM FOR ROLL CONTAINERS

BACKGROUND OF THE INVENTION

The invention relates to a conveying system for roll containers having no more than one fixed axis on which wheels are aligned and at least one swivel wheel. In the postal service several systems of this type are known, such as those employing small deep loaders, conveyers installed flush with the floor, etc. for transporting roll containers on railway station platforms.

SUMMARY OF THE INVENTION

The system is characterized by a track constituted by a transversely sloping floor and a conveyer installed over the lower side of the floor in order to move along—by friction—any roll containers placed on the floor. The conveyer can be of the type used as a hand-rail with escalators.

The invention provides a very simple system which, nevertheless, meets the requirements of being robust, allowing containers to be delivered or withdrawn at any point and needing no supervision or control, which does not absolutely occupy floor space and is very reliable. The system according to the invention can be employed universally. For example, it is very attractive for use in stores for conveying roll containers for replenishing stocks and in car parks for recovering trolleys left there by motorists.

The system is suited for roll containers having four swivel wheels as well as for those having two swivel wheels and two wheels aligned on a fixed axis.

BRIEF DESCRIPTION OF THE VIEWS

The above mentioned and other features, objects and advantages and a manner of attaining them are described more specifically below by reference to an embodiment of the invention shown in the accompanying drawings, wherein.

DETAILED DESCRIPTION OF PREFERRED EMBODIMENTS

Figure 1:
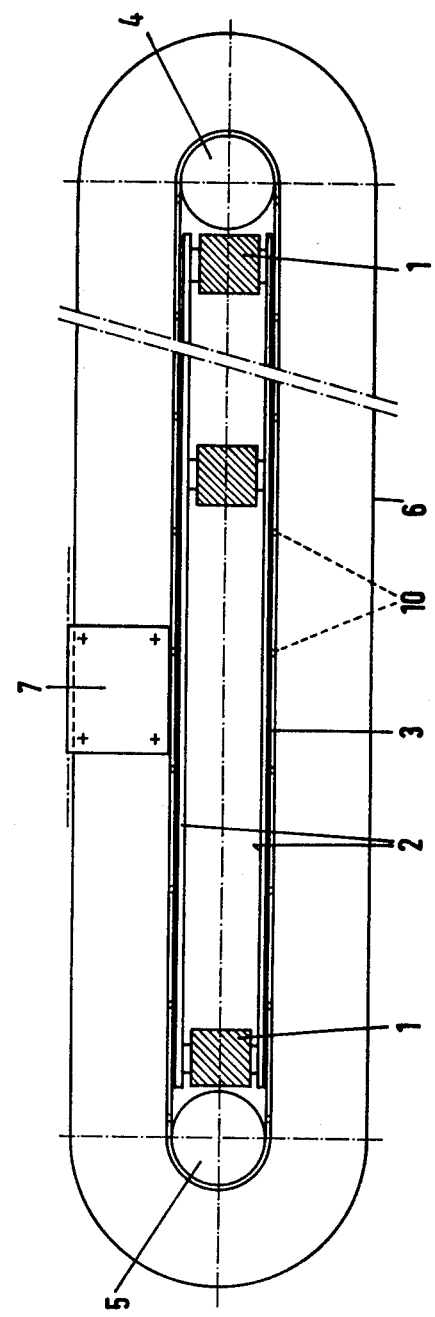
FIG. 1 is a schematic plan view of a track and conveyer for roll containers according to a preferred embodiment of this invention.

Horizontal supporting beams 2 are fixed to a number of pillars 1, e.g. the supports of the platform roofing, at about 60 cm above the floor. These beams support the conveyer 3 having a driving pulley 4 and a return pulley 5. The floor around slopes down from the line 6 (see FIG. 2) to the conveyor 3. A roll container 7 has laid itself sideways against the conveyer.

Figure 2:
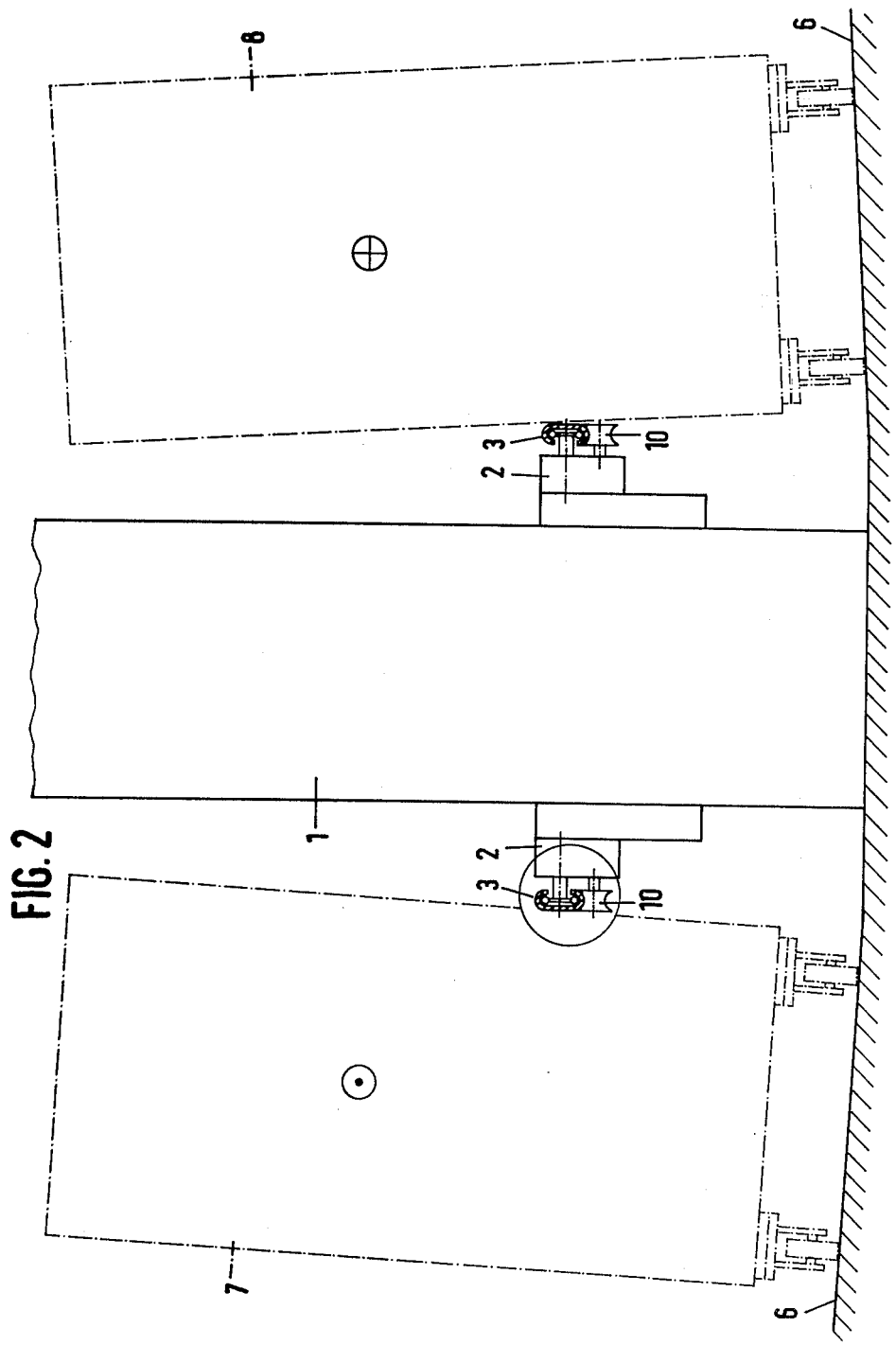
FIG. 2 is an enlarged cross-section taken along line II—II of FIG. 1 showing this track and two roll containers thereon in dot-dash lines.
Figure 3:
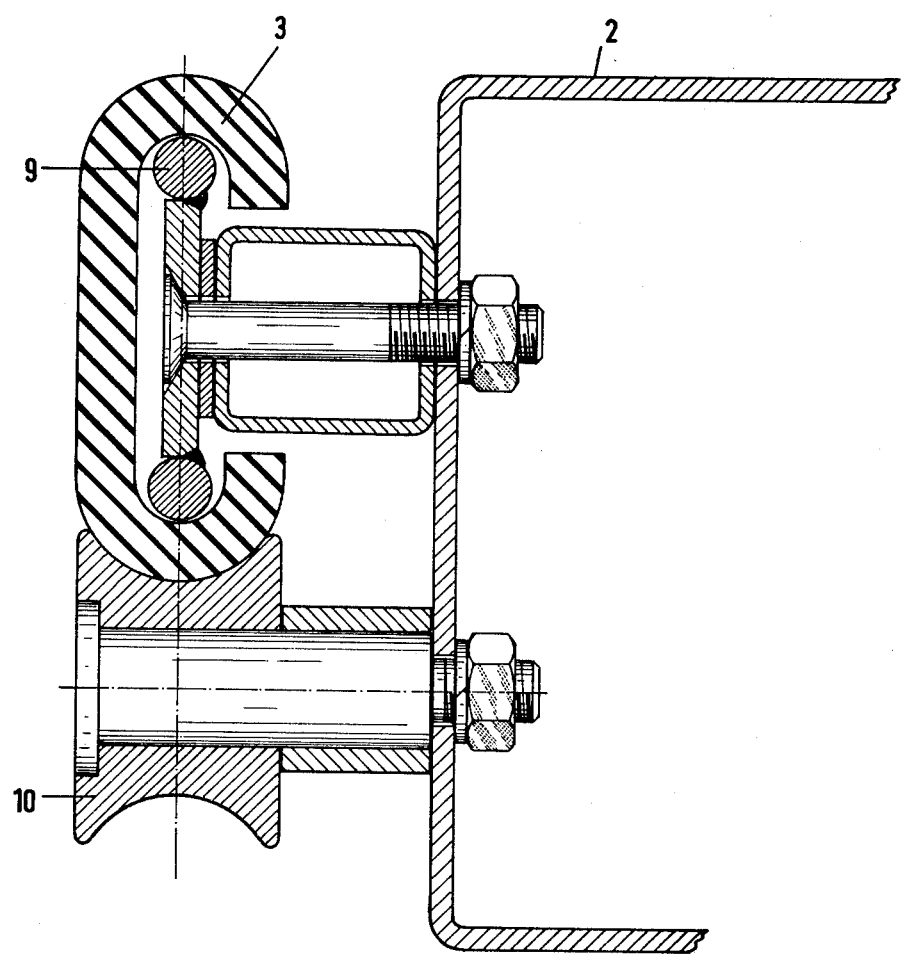
FIG. 3 is a further enlarged cross-sectional view of that part of the conveyer enclosed in the circle III in FIG. 2.

FIG. 2 shows the conveying system with two roll containers 7 and 8 moving forward and backward, respectively.

The conveyer 3 consists of a C-shaped rubbed profile reinforced with canvas and steel, which is kept in its place by a guiding frame 9 fixed to the supporting beams 2.

Rollers 10, which support the conveyer at equal distances, are also fixed to the beams 2.

If a roll container is pushed on to the sloping floor, it will roll against the conveyer and be taken along with it by friction, one or more swivel wheels allowing the necessary rotation.

The capacity of the conveying system is large, as the containers can be placed close together against the conveyer 3 and can be taken along the whole endless track. The track shown in FIG. 1 has two outer curves, but the system is not limited to this embodiment. Inner curves can be provided as well.

An advantage of the conveying system according to the invention is that the containers need not be changed or adapted.

While there is described above the principles of this invention in connection with specific apparatus, it is to be clearly understood that this description is made only by way of example and not as a limitation to the scope of this invention.

What we claimed is:

1. A conveying system for a plurality of substantially identical separate roll containers having vertical sidewalls and being mounted on wheels for random movement over a floor, said system comprising:
   (A) a track in said floor comprising a path having a flat slightly sloping cross-section so that one edge of the path is flush with the floor and the other edge of said path is spaced below the level of the floor, and
   (B) a driven endless conveyer belt horizontal with and spaced above said other edge of said path to frictionally contact a vertical sidewall of said containers to move said containers along said path when said containers are moved from said floor over said one edge of said path onto said path.

2. A system according to claim 1 including rollers for supporting said conveyer belt.

* * * * *